United States Patent
Herring et al.

(10) Patent No.: US 10,451,211 B2
(45) Date of Patent: Oct. 22, 2019

(54) RADICAL-NEUTRALIZING COATING FOR A LUBRICANT SYSTEM

(71) Applicant: UNITED TECHNOLOGIES CORPORATION, Farmington, CT (US)

(72) Inventors: Neal R Herring, East Hampton, CT (US); Haralambos Cordatos, Colchester, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 0 days.

(21) Appl. No.: 15/852,459

(22) Filed: Dec. 22, 2017

(65) Prior Publication Data

US 2018/0119870 A1 May 3, 2018

Related U.S. Application Data

(63) Continuation-in-part of application No. 14/887,218, filed on Oct. 19, 2015, now Pat. No. 9,920,724.

(51) Int. Cl.
*F16L 58/04* (2006.01)
*C23C 30/00* (2006.01)
*C23C 2/28* (2006.01)
*C23C 2/04* (2006.01)
(Continued)

(52) U.S. Cl.
CPC ............... *F16L 58/04* (2013.01); *C23C 2/04* (2013.01); *C23C 2/28* (2013.01); *C23C 18/1216* (2013.01); *C23C 30/00* (2013.01); *F01D 25/18* (2013.01); *F05D 2230/90* (2013.01); *F05D 2300/15* (2013.01); *Y02T 50/671* (2013.01)

(58) Field of Classification Search
CPC ... F16L 58/04; C23C 2/04; C23C 2/28; C23C 18/1216; C30C 30/00; F01D 25/18; F05D 2230/90; F05D 2300/15
USPC .......................................................... 123/445
See application file for complete search history.

(56) References Cited

U.S. PATENT DOCUMENTS 2,852,454 A 9/1958 Ira et al.
5,269,137 A 12/1993 Edwards, III
(Continued)

FOREIGN PATENT DOCUMENTS

CN 104895641 9/2015
EP 0416906 3/1991
(Continued)

OTHER PUBLICATIONS

Aguilar, G. et. al., Oxidative Degradation and Stabilisation of Mineral Oil-Based Lubricants, Chemistry and Technology of Lubricants, 3rd Edition, Chapter 4, pp. 107-152.
(Continued)

*Primary Examiner* — Mahmoud Gimie
(74) *Attorney, Agent, or Firm* — Snell & Wilmer, L.L.P.

(57) ABSTRACT

A method may comprise preparing a radical-neutralizing composition comprising a cerium compound and a carrier; applying the radical-neutralizing composition to a passageway surface of a lubricant passageway in a lubricant system component; and/or drying the radical-neutralizing composition to form a radical-neutralizing coating on the passageway surface comprising cerium oxide.

20 Claims, 3 Drawing Sheets

(51) Int. Cl.
*C23C 18/12* (2006.01)
*F01D 25/18* (2006.01)

(56) References Cited

U.S. PATENT DOCUMENTS

| | | | | |
|---|---|---|---|---|
| 5,534,308 | A | * 7/1996 | Bamberg | .................. C23C 4/02 |
| | | | | 427/190 |
| 8,008,225 | B2 | 8/2011 | Henze et al. | |
| 2006/0233691 | A1 | * 10/2006 | Vanderspurt | ........... B01J 23/002 |
| | | | | 423/263 |
| 2006/0254130 | A1 | * 11/2006 | Scattergood | .......... C10L 1/1233 |
| | | | | 44/457 |
| 2009/0104089 | A1 | * 4/2009 | Hirth | .................... B01D 53/945 |
| | | | | 422/177 |
| 2012/0258254 | A1 | 10/2012 | Ma et al. | |
| 2013/0219914 | A1 | * 8/2013 | Budge | .................... C10G 27/04 |
| | | | | 60/780 |
| 2017/0107960 | A1 | 4/2017 | Opalka et al. | |
| 2017/0159870 | A1 | 6/2017 | Budaragin et al. | |

FOREIGN PATENT DOCUMENTS

| | | |
|---|---|---|
| EP | 1905500 | 4/2008 |
| EP | 3159059 | 4/2017 |
| WO | 2006130473 | 12/2006 |

OTHER PUBLICATIONS

Bunluesin, T. et. al., "Studies of the Water-Gas-Shift on Ceria-Supported Pt, Pd, and Rh: Implications for Oxygen-Storage Properties", Applied Catalysis B: Environmental 15 (1998), pp. 107-114.
Ying Xue et. al., "Direct Evidence for Hydroxyl Radical Scavenging Activity of Cerium Oxide Nanoparticles", The Journal of Physical Chemistry, pp. 4433-4438, ACS Publications, (2011).
Tzia Ming Onn et al., "High-Surface Area Ceria-Zirconia Films Prepared by Atomic Layer Deposition", Catal Lett, (2017) 147, pp. 1464-1470, Springer.
Cordatos, H. et. al., "Simulated Annealing Study of the Structure and Reducibility in Ceria Clusters", J. Phys. Chem., (1996), vol. 100 No. 46, pp. 18128-18132.
Min Zuo, "Sol-gel Route to Ceria Coatings on AA2024-T3 Aluminum Alloy", J. Coat Technol. Res., 12 (1), pp. 75-83, (2015), American Coatings Association 2014.
Cordatos, H., "Effect of Ceria Structure on Oxygen Migration for Rh/Ceria Catalysts", J. Phys. Chem, 1996, vol. 100, pp. 785-789, American Chemical Society 1996.
European Patent Office, European Search Report dated May 28, 2019 in Application No. 18213594.7.

* cited by examiner

RADICAL-NEUTRALIZING COATING FOR A LUBRICANT SYSTEM

CROSS-REFERENCE TO RELATED APPLICATION

This application is a Continuation-In-Part of, and claims priority to, and the benefit of U.S. Ser. No. 14/887,218 filed Oct. 19, 2015 and entitled "CHEMICAL SCAVENGING COMPONENT FOR A FUEL SYSTEM," which is hereby incorporated by reference in its entirety.

FIELD

This disclosure generally relates to radical-neutralizing coatings in lubrication systems.

BACKGROUND

Hydrocarbons in lubricant systems often comprise dissolved oxygen. In the presence of heat, the hydrocarbons and oxygen may form molecules having free radicals, such as alkyl and/or alkoxy radicals, which may react with the inner surfaces of lubricant systems to form carbonaceous deposits, such as coke or varnish. Such carbonaceous deposits may cause blockages within the lubricant system.

SUMMARY

In various embodiments, a method may comprise preparing a radical-neutralizing composition comprising a cerium compound and a carrier; applying the radical-neutralizing composition to a passageway surface of a lubricant passageway in a lubricant system component; and/or drying the radical-neutralizing composition to form a radical-neutralizing coating on the passageway surface comprising cerium oxide. In various embodiments, preparing the radical-neutralizing composition may comprise combining cerium nitrate in the carrier. The carrier may be at least one of water or a mixture of ethanol and polyethylene glycol. Applying the radical-neutralizing composition to the passageway surface may comprise dipping the lubricant passageway into the radical-neutralizing composition. In various embodiments, drying the passageway surface may comprise calcination of the radical-neutralizing composition at a temperature ranging from 446° C. to 997° C. In various embodiments, the radical-neutralizing coating may comprise a coating thickness ranging from one nanometer to one micrometer. The radical-neutralizing coating may comprise a plurality of cerium oxide nanocrystallites each having a size ranging from one nanometer to five nanometers.

In various embodiments, a lubrication system may comprise a lubricant system component comprising a lubricant passageway defined by a passageway surface, wherein the lubricant passageway may be configured to receive a lubricant; and/or a radical-neutralizing coating coupled to the passageway surface comprising cerium oxide, wherein the radical-neutralizing coating has a coating thickness ranging from one nanometer to one micrometer. In various embodiments, the radical-neutralizing coating thickness may range from 0.2 micrometer to one micrometer. In various embodiments, the radical-neutralizing coating may further comprise a dopant. The dopant may be at least one of lanthanum or zirconium. In various embodiments, the cerium oxide may comprise between 50% and 99.9% by weight of the radical-neutralizing coating. In various embodiments, the dopant may comprise between 0.01% and 50% of the radical-neutralizing coating. In various embodiments, the dopant may comprise between 0.01% and 10% of the radical-neutralizing coating.

In various embodiments, a lubrication system may comprise a lubricant system component comprising a lubricant passageway defined by a passageway surface, wherein the lubricant passageway may be configured to receive a lubricant; and/or a radical-neutralizing coating coupled to the passageway surface comprising cerium oxide, wherein the radical-neutralizing coating may comprise a plurality of cerium oxide nanocrystallites each having a size ranging from one nanometer to five nanometers. In various embodiments, the size of each cerium oxide nanocrystallite may range from one nanometer to two nanometers. In various embodiments, the size of each cerium oxide nanocrystallite may range from two nanometers to five nanometers.

In various embodiments, the radical-neutralizing coating may further comprise a dopant. In various embodiments, the dopant may be at least one of lanthanum or zirconium. In various embodiments, the cerium oxide may comprise between 50% and 99.9% by weight of the radical-neutralizing coating. In various embodiments, the dopant may comprise between 0.01% and 50% of the radical-neutralizing coating. In various embodiments, the dopant may comprise between 0.01% and 10% of the radical-neutralizing coating. In various embodiments, the radical-neutralizing coating may comprise a coating thickness ranging between one nanometer and one micrometer.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures. Elements with the like element numbering throughout the figures are intended to be the same.

DETAILED DESCRIPTION

All ranges may include the upper and lower values, and all ranges and ratio limits disclosed herein may be combined. It is to be understood that unless specifically stated otherwise, references to "a," "an," and/or "the" may include one or more than one and that reference to an item in the singular may also include the item in the plural.

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical, chemical, and mechanical changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact.

Figure 1:
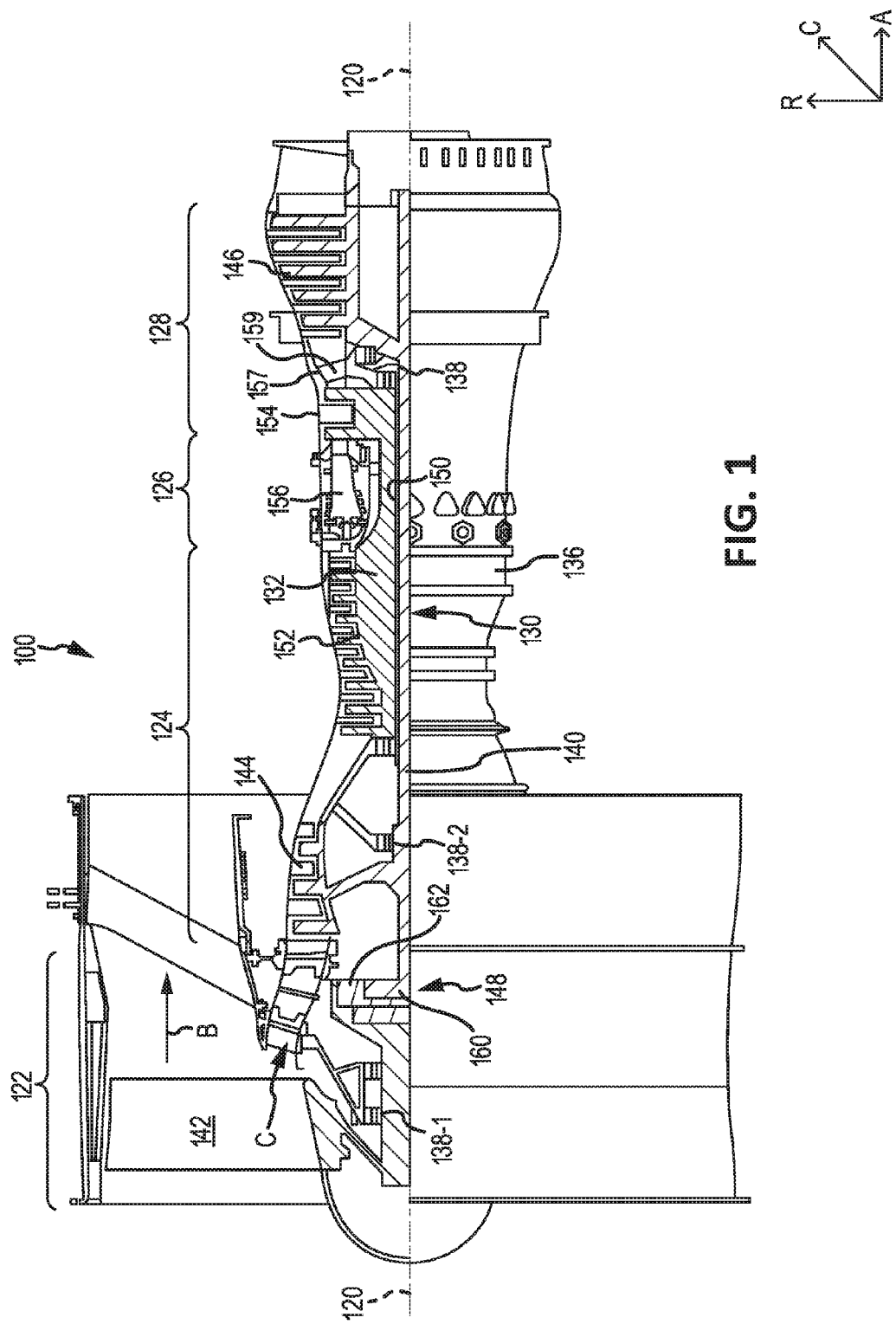
FIG. 1 illustrates a gas turbine engine, in accordance with various embodiments.

In various embodiments, and with reference to FIG. 1, a gas turbine engine 100 is disclosed. As used herein, "aft" refers to the direction associated with a tail (e.g., the back end) of an aircraft, or generally, to the direction of exhaust of gas turbine engine 100. As used herein, "forward" refers to the direction associated with a nose (e.g., the front end) of the aircraft, or generally, to the direction of flight or motion. An A-R-C axis has been included to illustrate the axial (A), radial (R) and circumferential (C) directions. For clarity, axial axis A spans parallel to axis of rotation 120. As utilized herein, radially inward refers to the negative R direction towards axis of rotation 120, and radially outward refers to the R direction away from axis of rotation 120.

Gas turbine engine 100 may comprise a two-spool turbofan that generally incorporates a fan section 122, a compressor section 124, a combustor section 126, and a turbine section 128. Gas turbine engine 100 may also comprise, for example, an augmenter section, and/or any other suitable system, section, or feature. In operation, fan section 122 may drive air along a bypass flow-path B, while compressor section 124 may further drive air along a core flow-path C for compression and communication into combustor section 126, before expansion through turbine section 128. FIG. 1 provides a general understanding of the sections in a gas turbine engine, and is not intended to limit the disclosure. The present disclosure may extend to all types of applications and to all types of turbine engines, including, for example, turbojets, turboshafts, and three spool (plus fan) turbofans wherein an intermediate spool includes an intermediate pressure compressor ("IPC") between a low pressure compressor ("LPC") and a high pressure compressor ("HPC"), and an intermediate pressure turbine ("IPT") between the high pressure turbine ("HPT") and the low pressure turbine ("LPT").

In various embodiments, gas turbine engine 100 may comprise a low speed spool 130 and a high speed spool 132 mounted for rotation about an axis of rotation 120 relative to an engine static structure 136 via one or more bearing systems 138 (shown as, for example, bearing system 138-1 and bearing system 138-2 in FIG. 1). It should be understood that various bearing systems 138 at various locations may alternatively or additionally be provided, including, for example, bearing system 138, bearing system 138-1, and/or bearing system 138-2.

In various embodiments, low speed spool 130 may comprise an inner shaft 140 that interconnects a fan 142, a low pressure (or a first) compressor section 144, and a low pressure (or a second) turbine section 146. Inner shaft 140 may be connected to fan 142 through a geared architecture 148 that can drive fan 142 at a lower speed than low speed spool 130. Geared architecture 148 may comprise a gear assembly 160 enclosed within a gear housing 162. Gear assembly 160 may couple inner shaft 140 to a rotating fan structure. High speed spool 132 may comprise an outer shaft 150 that interconnects a high pressure compressor ("HPC") 152 (e.g., a second compressor section) and high pressure (or a first) turbine section 154. A combustor 156 may be located between HPC 152 and high pressure turbine 154. A mid-turbine frame 157 of engine static structure 136 may be located generally between high pressure turbine 154 and low pressure turbine 146. Mid-turbine frame 157 may support one or more bearing systems 138 in turbine section 128. Inner shaft 140 and outer shaft 150 may be concentric and may rotate via bearing systems 138 about axis of rotation 120. As used herein, a "high pressure" compressor and/or turbine may experience a higher pressure than a corresponding "low pressure" compressor and/or turbine.

In various embodiments, the air along core airflow C may be compressed by low pressure compressor 144 and HPC 152, mixed and burned with fuel in combustor 156, and expanded over high pressure turbine 154 and low pressure turbine 146. Mid-turbine frame 157 may comprise airfoils 159 located in core airflow path C. Low pressure turbine 146 and high pressure turbine 154 may rotationally drive low speed spool 130 and high speed spool 132, respectively, in reaction to the expansion exhaust gases.

In various embodiments, gas turbine engine 100 may comprise a high-bypass ratio geared aircraft engine. The bypass ratio of gas turbine engine 100 may also be greater than ten (10:1). Geared architecture 148 may be an epicyclic gear train, such as a star gear system (sun gear in meshing engagement with a plurality of star gears supported by a carrier and in meshing engagement with a ring gear) or other gear system. Geared architecture 148 may have a gear reduction ratio of greater than about 2.3 and low pressure turbine 146 may have a pressure ratio that is greater than about five (5). The diameter of fan 142 may be significantly larger than that of the low pressure compressor section 144, and the low pressure turbine 146 may have a pressure ratio that is greater than about five (5:1). The pressure ratio of low pressure turbine 146 is measured prior to inlet of low pressure turbine 146 as related to the pressure at the outlet of low pressure turbine 146. It should be understood, however, that the above parameters are exemplary of various embodiments of a suitable geared architecture engine and that the present disclosure contemplates other turbine engines including direct drive turbofans.

The next generation turbofan engines are designed for higher efficiency and use higher pressure ratios and higher temperatures in high pressure compressor 152 than are conventionally experienced. These higher operating temperatures and pressure ratios create operating environments that cause thermal loads that are higher than the thermal loads conventionally experienced, which may shorten the operational life of current components, including flanges comprised in gas turbine engine 100.

Figure 2A:
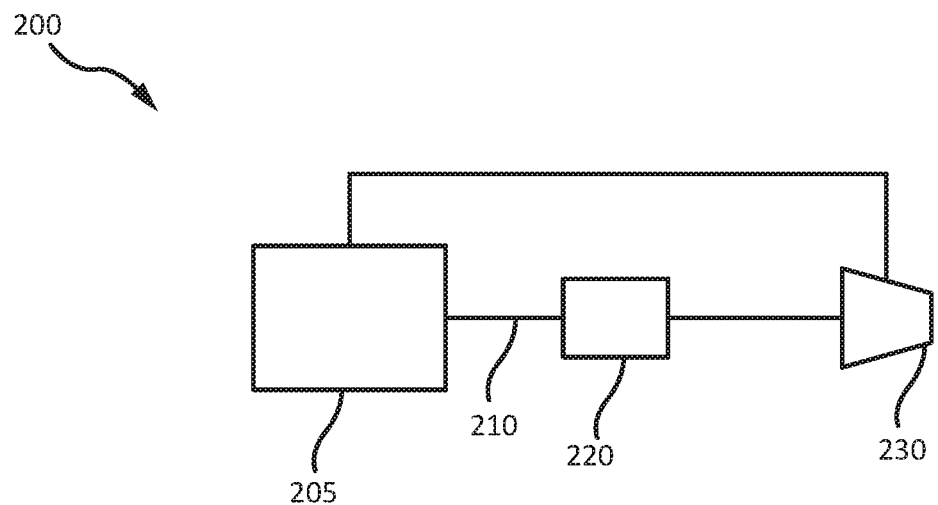
FIG. 2A illustrates a schematic view of a lubricant system, in accordance with various embodiments.

Gas turbine engine 100 may comprise lubricant systems throughout in order to provide a lubricant to the moving parts of gas turbine engine 100. The lubricant may comprise hydrocarbons (e.g., a petroleum-derived product), including oil, fuel, or the like. Referring to FIG. 2A, a schematic drawing of a lubrication system 200 of a gas turbine engine is depicted, in accordance with various embodiments. Lubrication system 200 may comprise a lubricant source 205, a lubricant delivery device 210, an engine component 220 which may receive and/or work on the lubricant, and a lubricant delivery system 230 which may facilitate delivery of the lubricant to another location within the gas turbine engine. In various embodiments, lubricant within lubrication system 200 may be recycled back to lubricant source 205 (e.g., by lubricant delivery system 230) for reuse. Lubrication system 200 may comprise various other components, including lubricant valves, heat exchangers, filters, and/or bearings, each of which may have a passage through which lubricant may travel.

Figure 2B:
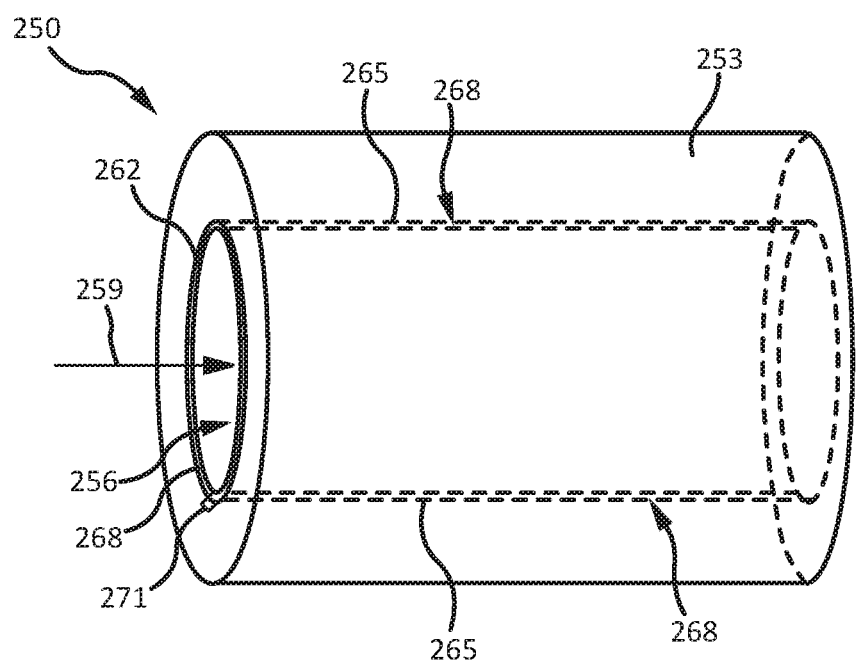
FIG. 2B illustrates a perspective view of a lubricant system component having a lubricant passageway with a radical-neutralizing coating, in accordance with various embodiments.

FIG. 2B depicts a lubricant system component 250, in accordance with various embodiments. With combined reference to FIGS. 2A and 2B, lubricant system component 250 may be comprised in lubrication system 200, and may be a component through which a lubricant may travel. For example, lubricant system component 250 may be an example of lubricant delivery device 210, or a part of engine component 220. To provide various examples, engine component 220 may be an airfoil and lubricant system component 250 may disposed therein; engine component 220 may be a heat exchanger designed to cool a lubricant 259 flowing therethrough and lubricant system component 250 may be one of the cooling tubes of the heat exchanger; engine component 220 may be a bearing and lubricant system component 250 may be a bearing cavity. Lubricant system component 250 may comprise a shell 253 with a lubricant passageway 256 disposed therein and/or therethrough. Lubricant passageway 256 may be any space which receives a lubricant 259. Lubricant 259 may travel through and/or in lubricant passageway 256. In various embodiments, lubricant passageway 256 may be defined by a lubricant passageway rim 262 and a passageway surface 265 spanning the length of lubricant system component and lubricant passageway 256.

The hydrocarbons in lubricant 259 traveling through lubrication system 200 and lubricant system component may be exposed to heat and dissolved oxygen. Radical-neutralizing coating 268 is disposed along the length of lubricant passageway 256 and passageway surface 265. Thus, radical-neutralizing coating 268 tends to act to neutralize free radicals, such as alkyl and/or alkoxy radicals, which may form due to reactions between the hydrocarbons and dissolved oxygen. In various embodiments, radical-neutralizing coating 268 may comprise cerium oxide, which may be reactive with the radicals in lubricant 259, neutralizing them such that the radicals are unable to react with passageway surface 265 and create deposits within lubricant passageway 256. The cerium oxide in radical-neutralizing coating 268 may neutralize the radicals in lubricant 259, while regenerating itself such that such a reaction between the cerium oxide in radical-neutralizing coating 268 and the radicals in lubricant 259 does not cause deterioration from radical-neutralizing coating 268. The reaction mechanism may be as follows: (1) upon formation in air (e.g., oxygen ($O_2$)), the cerium oxide in radical-neutralizing coating 268 has an oxidation state of plus-4 (cerium(IV) oxide ($CeO_2$)); (2) a hydrocarbon molecule in lubricant 259 (having a chemical structure of RH, where R is an alkyl group originating from hydrocarbon lubricant molecules) may react with cerium (IV) oxide; (3) as a result, the cerium(IV) in the cerium(IV) oxide may be reduced to cerium(III) by the hydrocarbon molecule, producing cerium(III) oxide ($Ce_2O_3$) and an alcohol (ROH), the alcohol being a stable product that does not pose a risk of creating deposits within lubricant passageway 256; (3) an alkoxy radical in lubricant 259 (having a chemical structure of RO.) may react with the cerium(III) oxide; (5) as a result, the cerium(III) in the cerium(III) oxide may be oxidized back to cerium(IV), producing cerium(IV) oxide and an alkyl radical, the alkyl radical being a product that may not pose a significant risk of creating deposits within lubricant passageway 256, and the described reaction mechanism may start again. Accordingly, radical-neutralizing coating 268 may be capable of neutralizing alkoxy radicals, while regenerating itself in a continuous cycle. The chemical equations for the reaction mechanism described above are shown in Scheme 1 and Scheme 2 below:

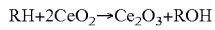

$$RH + 2CeO_2 \rightarrow Ce_2O_3 + ROH \quad \text{Scheme 1}$$

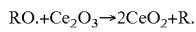

$$RO. + Ce_2O_3 \rightarrow 2CeO_2 + R. \quad \text{Scheme 2}$$

In various embodiments, radical-neutralizing coating 268 may have a coating thickness 271, measured radially, ranging from 1 nanometer (nm) ($3.9e^{-8}$ inch) and 1 micrometer (μm) ($3.9e^{-5}$ inch). In various embodiments, coating thickness 271 may be between 0.2 μm ($7.9e^{-6}$ inch) and 1 micrometer (μm) ($3.9e^{-5}$ inch). In various embodiments, radical-neutralizing coating 268 may be less than 0.2 μm ($7.9e^{-6}$ inch).

In various embodiments, the cerium oxide in radical-neutralizing coating 268 may be in nanocrystallite form. Radical-neutralizing coating 268 may comprise cerium oxide nanocrystallites each having a size ranging from 1 nm ($3.9e^{-8}$ inch) to 12 nm ($4.7e^{-7}$ inch). In various embodiments, each cerium oxide nanocrystallite in radical-neutralizing coating 268 may have a size ranging from 1 nm ($3.9e^{-8}$ inch) to 2 nm ($7.9e^{-8}$ inch). In various embodiments, each cerium oxide nanocrystallite in radical-neutralizing coating 268 may have a size ranging from 1 nm ($3.9e^{-8}$ inch) or 2 nm ($7.9e^{-8}$ inch) to 5 nm ($2.0e^{-7}$ inch).

In various embodiments, radical-neutralizing coating 268 may comprise cerium oxide and a dopant. The dopant may be elemental zirconium and/or lanthanum. The presence of zirconium and/or lanthanum may tend to facilitate the transition of cerium between oxidation states in the oxidation/reduction reaction mechanism described above. In various embodiments, radical-neutralizing coating 268 may comprise 100% cerium oxide. In various embodiments, radical-neutralizing coating 268 may comprise between 50% and 99.9% or 100% by weight cerium oxide. In various embodiments, radical-neutralizing coating 268 may comprise between 60% and 80% by weight cerium oxide. In various embodiments, radical-neutralizing coating 268 may comprise between 0% or 0.01% and 50% by weight dopant. In various embodiments, radical-neutralizing coating 268 may comprise between 0% or 0.01% and 10% by weight dopant. In various embodiments, radical-neutralizing coating 268 may comprise between 1% and 10% by weight dopant. In various embodiments, radical-neutralizing coating 268 may comprise between 10% and 20% by weight dopant.

Figure 3:
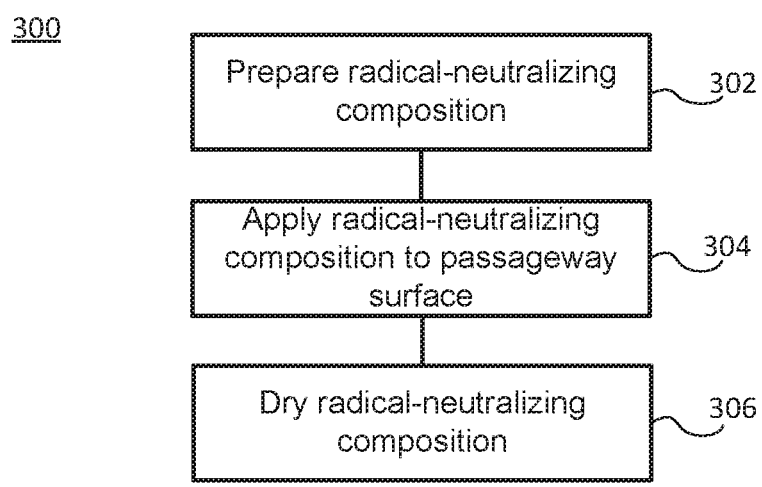
FIG. 3 depicts a block diagram illustrating a method for disposing a radical-neutralizing coating on a passageway surface of a lubricant passageway, in accordance with various embodiments.

With reference to FIGS. 2B and 3, a method 300 for disposing a radical-neutralizing coating 268 on a passageway surface 265 is depicted, in accordance with various embodiments. In various embodiments, a radical-neutralizing composition may be prepared (step 302). The radical-neutralizing composition may be prepared, in various embodiments, by combining a cerium compound and a carrier (e.g., a solvent). The cerium compound may comprise cerium nitrate, which may be dissolved in the carrier. In various embodiments, the cerium compound may comprise cerium(IV) tetramethylheptanedionate ($Ce(TMHD)_4$) in preparation for application by atomic layer deposition (ALD), for example. The carrier may be water and/or a mixture of ethanol and polyethylene glycol, and/or any other suitable carrier. In various embodiments, in addition to the cerium compound and a carrier, a dopant such as zirconium nitrate and/or lanthanum nitrate may be added to the radical-neutralizing composition. The concentrations of the components in the radical-neutralizing composition may be adjusted depending on the desired coating thickness of radical-neutralizing coating 268 in response to applying and drying the radical-neutralizing composition.

In various embodiments, the radical-neutralizing composition may be applied to passageway surface 265 (step 304). The radical-neutralizing composition may be applied by any known technique such as spraying, dip-coating, and/or passing the radical-neutralizing composition through lubricant passageway 256. For example, the radical-neutralizing composition may be sprayed onto passageway surface 265. During spraying, passageway surface 265, or any other substrate upon which the radical-neutralizing composition is applied, may be maintained at an elevated temperature (e.g., ranging from 277° C. (530° F.) to 477° C. (890° F.), or from 327° C. (620° F.) to 426° C. (800° F.). For dip-coating, the radical-neutralizing composition may be a sol-gel in which the lubricant system component is dipped one or more times. Similarly for passing the radical-neutralizing composition through lubricant passageway 256, the radical-neutralizing composition may be a sol-gel. In various embodiments, the radical-neutralizing composition may be applied by atomic layer deposition (ALD).

In response to applying the radical-neutralizing composition to passageway surface 265, the radical-neutralizing composition on passageway surface 265 may be dried (step 306) (e.g., by being air-dried, or dried under heat (e.g., heat treating)) to form radical-neutralizing coating 268. In various embodiments, drying the radical-neutralizing composition may comprise calcination at temperatures between, for example, 446° C. (836° F.) and 997° C. (1826° F.), or between 527° C. (980° F.) and 727° C. (1340° F.).

The systems and methods described herein are discussed in relation to a lubrication system within a gas turbine engine. However, it should be understood that the systems and methods described herein may be applied to any engine, engine component, or device comprising lubricant passageways which are prone to blockage from the reaction of radicals forming carbonaceous deposits.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method, comprising:
preparing a radical-neutralizing composition comprising a cerium compound and a carrier;
applying the radical-neutralizing composition to a passageway surface of a lubricant passageway in a lubricant system component, wherein the lubricant passageway is configured to receive a liquid lubricant;
drying the radical-neutralizing composition to form a radical-neutralizing coating on the passageway surface comprising cerium oxide;
flowing the liquid lubricant through the lubricant passageway; and
neutralizing at least one of an alkoxy radical or an alkyl radical comprised in the liquid lubricant.

2. The method of claim 1, wherein the preparing the radical-neutralizing composition comprises combining cerium nitrate in the carrier, wherein the carrier is at least one of water or a mixture of ethanol and polyethylene glycol, and wherein applying the radical-neutralizing composition to the passageway surface comprises dipping the lubricant passageway into the radical-neutralizing composition.

3. The method of claim 1, wherein the drying the passageway surface comprises calcination of the radical-neutralizing composition at a temperature ranging from 446° C. to 997° C.

4. The method of claim 1, wherein the radical-neutralizing coating comprises a coating thickness ranging from one nanometer to one micrometer, and wherein the radical-neutralizing coating comprises a plurality of cerium oxide nanocrystallites each having a size ranging from one nanometer to five nanometers.

5. A lubrication system, comprising:
a lubricant system component comprising a lubricant passageway defined by a passageway surface and configured to allow passage of a liquid lubricant therethrough; and
a radical-neutralizing coating coupled to and along the passageway surface comprising cerium oxide, wherein the radical-neutralizing coating has a coating thickness ranging from one nanometer to one micrometer, and wherein the radical-neutralizing coating is configured to neutralize at least one of an alkoxy radical or an alkyl radical comprised in the liquid lubricant.

6. The lubrication system of claim 5, wherein the radical-neutralizing coating further comprises a dopant.

7. The lubrication system of claim 6, wherein the dopant is at least one of lanthanum or zirconium.

8. The lubrication system of claim 6, wherein the cerium oxide comprises between 50% and 99.9% by weight of the radical-neutralizing coating.

9. The lubrication system of claim 6, wherein the dopant comprises between 0.01% and 50% of the radical-neutralizing coating.

10. The lubrication system of claim 6, wherein the dopant comprises between 0.01% and 10% of the radical-neutralizing coating.

11. The lubrication system of claim 5, wherein the radical-neutralizing coating thickness ranges from 0.2 micrometer to one micrometer.

12. A lubrication system, comprising:
a lubricant system component comprising a lubricant passageway defined by a passageway surface and configured to allow passage of a liquid lubricant therethrough; and
a radical-neutralizing coating coupled to and along the passageway surface comprising cerium oxide, wherein the radical-neutralizing coating comprises a plurality of cerium oxide nanocrystallites each having a size ranging from one nanometer to five nanometers, and wherein the radical-neutralizing coating is configured to neutralize at least one of an alkoxy radical or an alkyl radical comprised in the liquid lubricant.

13. The lubrication system of claim 12, wherein the size of each cerium oxide nanocrystallite ranges from one nanometer to two nanometers.

14. The lubrication system of claim 12, wherein the size of each cerium oxide nanocrystallite ranges from two nanometers to five nanometers.

15. The lubrication system of claim 12, wherein the radical-neutralizing coating further comprises a dopant.

16. The lubrication system of claim 15, wherein the dopant is at least one of lanthanum or zirconium.

17. The lubrication system of claim 15, wherein the cerium oxide comprises between 50% and 99.9% by weight of the radical-neutralizing coating.

18. The lubrication system of claim 15, wherein the dopant comprises between 0.01% and 50% of the radical-neutralizing coating.

19. The lubrication system of claim 15, wherein the dopant comprises between 0.01% and 10% of the radical-neutralizing coating.

20. The lubrication system of claim 12, wherein the radical-neutralizing coating comprises a coating thickness ranging between one nanometer and one micrometer.

* * * * *